J. F. KANE.
Taps, Plugs, and Faucet-Connections.
No. 144,680.    Patented Nov. 18, 1873.
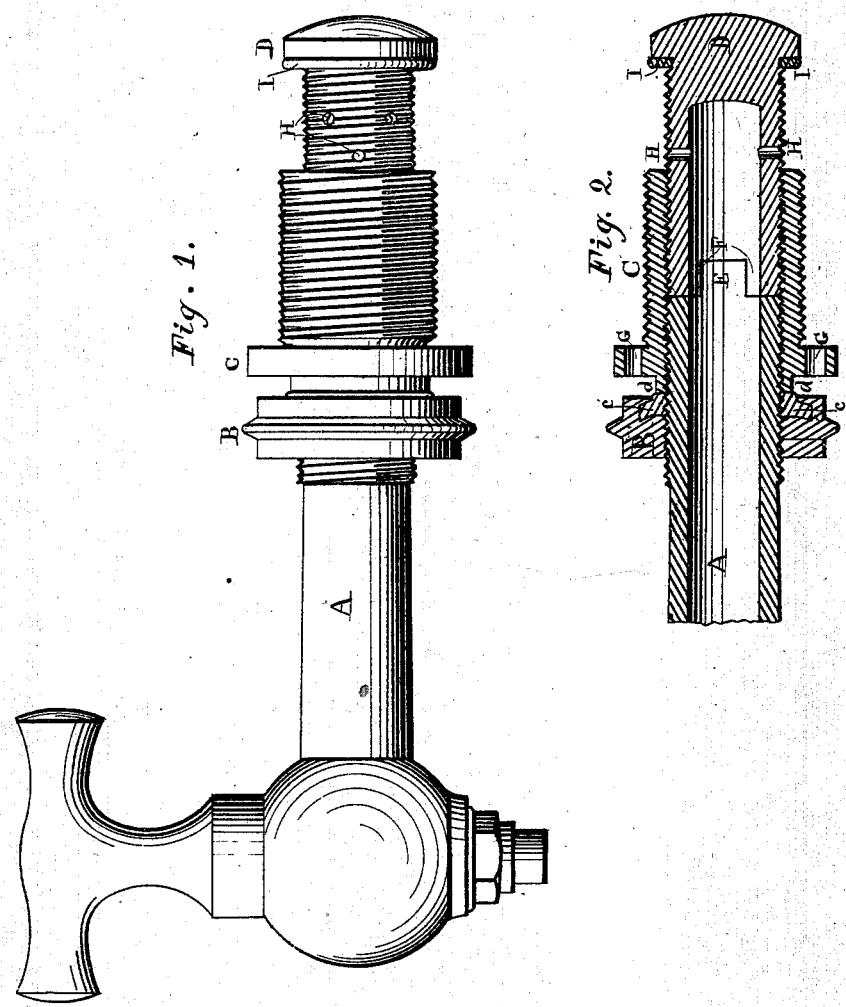
Witnesses,
Thomas L. Kaen
Frank D. Sindsen
Inventor,
John F. Kane

UNITED STATES PATENT OFFICE.

JOHN F. KANE, OF SAN FRANCISCO, CALIFORNIA, ASSIGNOR OF ONE-HALF HIS RIGHT TO SAMUEL GUTHRIE.

IMPROVEMENT IN TAPS, PLUGS, AND FAUCET-CONNECTIONS.

Specification forming part of Letters Patent No. 144,680, dated November 18, 1873; application filed July 2, 1873.

*To all whom it may concern:*

Be it known that I, JOHN F. KANE, of San Francisco, in the county of San Francisco and State of California, have invented a new and useful Improvement in Tap, Plug, and Faucet Connection; and I do hereby declare that the following is a full, clear, and exact description of the construction and operation of the same, reference being had to the annexed drawings making a part of this specification, in which—

Figure 1. A is a faucet. B is a lock-nut with a recess for packing, forming a combined lock-nut and stuffing-box. C is a bushing, with an external and internal thread or screw. D is a hollow plug with an external thread or screw, perforated at a suitable distance from the closed end of the plug, and at the closed end of the plug there is a shoulder or flange.

Fig. 2 is a sectional view, showing the screw end of the faucet A. B is the lock-nut. c is the recess in the lock-nut, so formed that when the packing (being rubber) is forced in, it will not be displaced by frequent screwing up and unscrewing. C is the bushing, with a flange at the outer end. d d is a projection, against which the packing is screwed by the lock-nut. g g are holes opposite each other in flange, to receive a forked wrench for screwing in the bushing. D is the hollow plug which screws into and is the whole length of the bushing, notched at the end toward, and for the purpose of receiving, a projection on the end of the faucet, as shown by letters E and F F; H H, perforations. I I is the shoulder at the closed end of the plug, with a rubber or other washer, forming a perfectly tight joint when the shoulder is screwed against the inner end of the bushing by the removal of, or taking out of, the faucet.

The operation is as follows: A rubber or other washer is slipped over the hollow plug D to the shoulder I I. The plug is then screwed into the bushing, making a perfectly tight joint. The bushing is then screwed into the cask, pipe, or other vessel. The perforations H H are then closed or covered by the bushing. The bushing and hollow plug remain permanently in the cask or vessel until either of the three require renewal.

When it is desired to provide for the drawing off of the contents of the cask or vessel, the projections of the faucet or other connection are inserted in the notches of the hollow plug, and the thread of the faucet displaces the thread of the hollow plug in the bushing until the faucet or connection is firmly in place; the recessed lock-nut (the recess being filled with rubber) is then screwed firmly home, the packing in the lock-nut being screwed against the projection $d\ d$, making a perfectly tight joint.

The apertures H H are so situated that the travel of the hollow plug ahead of the faucet discloses them completely as soon as the faucet is securely entered, and communication is then opened between the contents of the vessel and the faucet.

When the faucet is withdrawn, the hollow plug travels behind it until a perfect closure is secured.

I claim as my invention—

The combination of the bushing C with an internal thread or screw, and the projection $d\ d$ on the outer end pressing against the packing in the recessed lock-nut B, the hollow plug D with an external thread or screw working into the thread of the bushing, and the notched end to receive the forked end of the faucet with the perforations H H, the recessed lock-nut B, forming as it does a combined lock-nut and stuffing-box, to prevent leakage, and the forked-ended faucet A, substantially as described, and for the purposes herein set forth.

JOHN F. KANE.

Witnesses:
THOMAS L. KAEN,
FRANK V. SCUDDER.